(12) United States Patent
Chen (10) Patent No.: US 8,990,219 B2
(45) Date of Patent: Mar. 24, 2015

(54) PROCESSING AND PUBLISHING DIGITAL CONTENTS INCLUDING ENCYCLOPEDIA

(71) Applicants: Peking University Founder Group Co., Ltd., Beijing (CN); Beijing Founder Electronics Co., Ltd., Beijing (CN)

(72) Inventor: Jinlian Chen, Beijing (CN)

(73) Assignees: Peking University Founder Group Co., Ltd., Beijing (CN); Beijing Founder Electronics Co., Ltd., Beijing (CN)

(*) Notice: Subject to any disclaimer, the term of this patent is extended or adjusted under 35 U.S.C. 154(b) by 131 days.

(21) Appl. No.: 13/725,200

(22) Filed: Dec. 21, 2012

(65) Prior Publication Data

US 2013/0166567 A1 Jun. 27, 2013

(51) Int. Cl.
 *G06F 17/30* (2006.01)

(52) U.S. Cl.
 CPC ........ *G06F 17/3007* (2013.01); *G06F 17/3092* (2013.01)

USPC .......................................................... 707/741

(58) Field of Classification Search
 USPC ........ 707/2, 3, 741; 706/50; 455/566; 705/14
 See application file for complete search history.

(56) References Cited

U.S. PATENT DOCUMENTS

| 2001/0041598 | A1* | 11/2001 | Yoshino et al. ................ 455/566 |
| 2008/0222074 | A1* | 9/2008 | Lieberwirth et al. ........... 706/50 |
| 2009/0037279 | A1* | 2/2009 | Chockalingam et al. ....... 705/14 |

* cited by examiner

*Primary Examiner* — Etienne Leroux
(74) *Attorney, Agent, or Firm* — Lathrop & Gage LLP (57) ABSTRACT

Techniques, devices and systems for publishing digital contents such as encyclopedia are provided. One method for such digital publishing includes obtaining entries of encyclopedic resource files; indexing attributes of each of the entries by using preset indexing rules; reorganizing the entries based on the attributes; and publishing the reorganized entries by applying a preset template.

12 Claims, 7 Drawing Sheets

```
<?xml version="1.0" encoding="UTF-8"?>
<Root xmlns="http://www.founder.com/ces" xmlns:dp="http://www.founder.com/2010/digitalPublish/labelTree">
    <条目>
        <dp:innerAttrs uid="-1" markSystem="百科条目" cmsLibId="72" resCode="Item" ver="-1" refUid="-1"/>
        <dp:attrs>
            <dp:attr name="DOC_CATALOG" displayName="百科分类"><![CDATA[科学]]></dp:attr>
            <dp:attr name="DOC_KEYWORD" displayName="关键词"><![CDATA[中药]]></dp:attr>
            <dp:attr name="DOC_SOURCE" displayName="来源"><![CDATA[中药材手册]]></dp:attr>
        </dp:attrs>
        <条头>
            <dp:innerAttrs uid="-1" markSystem="百科条目" cmsLibId="72" resCode="Item" ver="-1" refUid="-1"/>
            <segment xmlns="http://www.founder.com/PDMLSchema/2009/main" xmlns:m="http://www.founder.com/PDMLSchema/2009/math">
        </条头>
        <segment xmlns="http://www.founder.com/PDMLSchema/2009/main" xmlns:m="http://www.founder.com/PDMLSchema/2009/math">
        <释文>
        <segment xmlns="http://www.founder.com/PDMLSchema/2009/main" xmlns:m="http://www.founder.com/PDMLSchema/2009/math">
    </条目>
    <条目>
        <dp:innerAttrs uid="-1" markSystem="百科条目" cmsLibId="72" resCode="Item" ver="-1" refUid="-1"/>
        <dp:attrs>
            <dp:attr name="DOC_CATALOG" displayName="百科分类"><![CDATA[科学]]></dp:attr>
            <dp:attr name="DOC_KEYWORD" displayName="关键词"><![CDATA[中药]]></dp:attr>
            <dp:attr name="DOC_SOURCE" displayName="来源"><![CDATA[中药材手册]]></dp:attr>
        </dp:attrs>
        <条头>
        <segment xmlns="http://www.founder.com/PDMLSchema/2009/main" xmlns:m="http://www.founder.com/PDMLSchema/2009/math">
        <释文>
        <segment xmlns="http://www.founder.com/PDMLSchema/2009/main" xmlns:m="http://www.founder.com/PDMLSchema/2009/math">
    </条目>
</Root>
```

PROCESSING AND PUBLISHING DIGITAL CONTENTS INCLUDING ENCYCLOPEDIA

PRIORITY

This patent application claims priority of prior Chinese patent application No. 201110437546.X entitled "METHOD AND DEVICE FOR PUBLISHING ENCYCLOPEDIA" and filed Dec. 21, 2011, which is incorporated by reference in its entirety as part of this patent application.

TECHNICAL FIELD

This patent application relates to digital publishing, including publishing digital contents in various documents or forms, such as encyclopedia.

BACKGROUND

Digital or electronic publishing involves digital publication or distribution of contents in digital form to allow for easy access, and provide convenient portability by various electronic devices via digital storage devices or communication networks such as the Internet. Examples of some electronic devices used for accessing or carrying digital contents include electronic readers, desktop computers, portable computers such as laptop computers, notebook computers, tablet computers, mobile phones and smartphones and other wireless communication devices. Digital publishing also allows incorporation of multimedia contents and interactive features that are not easily available in paper publication.

One example of digital publishing is digital publishing of encyclopedic data or contents. The encyclopedic knowledge relates to a wide range of aspects of people's lives. Readers usually need to get desired content in a variety of ways rather than by reading throughout the entire encyclopedia. However, at present, in the field of digital publishing of a professional encyclopedia, such as professional medicine, most of the content resources of encyclopedic knowledge exist in the form of a paper publication media, which does not form a reusable content resource or a knowledge system. Since the amount of the professional encyclopedic knowledge content is very large and the professional encyclopedic knowledge content is very complicated, it is very difficult for readers to find a required aspect of the knowledge from the encyclopedia quickly.

SUMMARY

This patent application provides digital processing and publishing technology that can be used to provide a method and device for publishing digital contents such as encyclopedia. Implementations of the described technology can be used to achieve various benefits and advantages, including better management and publication of digital contents such as encyclopedia.

In one aspect, a method for publishing encyclopedia is provided to include obtaining entries of encyclopedic resource files; indexing attributes of each of the entries by using preset indexing rules; reorganizing the entries based on the attributes; and publishing the reorganized entries by applying a preset template.

In another aspect, a device for publishing encyclopedia is provided to include an obtaining module configured to obtain entries of encyclopedic resource files; an indexing module configured to index attributes of each of the entries by using preset indexing rules; a reorganizing module configured to reorganize the entries based on the attributes; and a publishing module configured to publish the reorganized entries by applying a preset template.

In yet another aspect, a network system for digital publishing is provided to include one or more computer storage devices that store digital documents including encyclopedic resource files; and one or more computer servers in communication with the one or more computer storage devices to have access to the digital documents including encyclopedic resource files. In this system, the one or more computer servers are configured to obtain entries of the encyclopedic resource files; index attributes of each of the entries by using preset indexing rules; reorganize the entries based on the attributes; and publish the reorganized entries by applying a preset template. In some implementations of this system, the one or more computer servers can be configured to allow a user to provide input to the one or more computer servers to initiate a search in the one or more computer storage devices to search and obtain the encyclopedic resource files based on the user input; the one or more computer servers are configured to allow a user to reorganize the entries based on the attributes. This system can be used by a publisher or content provider to distribute or publish digital contents to users.

Implementations of the disclosed technology can use a data structure to deal with the digital content (e.g., encyclopedic content) to achieve efficient publishing of the digital content or the encyclopedic knowledge.

These and other aspects and their implementations are described in greater detail in the attached drawing, the description and the claims.

BRIEF DESCRIPTION OF DRAWINGS

The accompanying drawings disclosed herein are used to provide a further understanding of the disclosed technology and constitute a part of the application.

FIG. 4 illustrates an xml file of entry content obtained from content reorganization according to an embodiment of the disclosed technology.

FIG. 6 is a view showing an effect diagram which illustrates selecting the built-in Epub template for the user to publish the entry content via a mobile device. Epub is an example of an electronic publication format standard for distributing and publishing digital publications and documents based on Web Standards. Epub defines protocols of representing, packaging and encoding structured and semantically enhanced Web content—e.g., XHTML, CSS, SVG, images, and other resources—for distribution in a single-file format. Epub allows publishers to produce and send a single digital publication file through distribution and offers consumers interoperability between software/hardware for unencrypted reflowable digital books and other publications.

DETAILED DESCRIPTION

Figure 1:
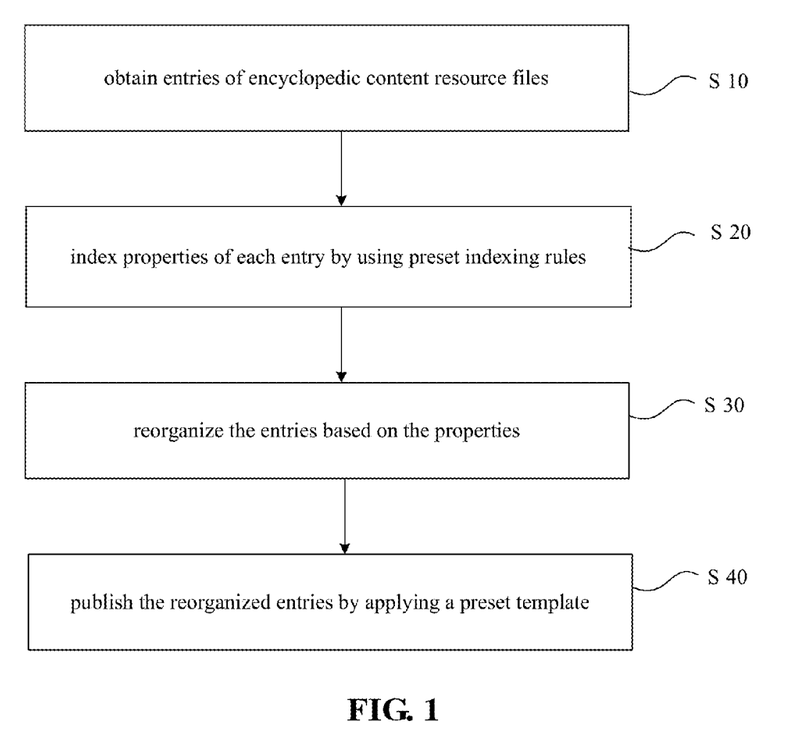
FIG. 1 is a flowchart illustrating a method for publishing encyclopedia according to an embodiment of the disclosed technology.

Specific examples for techniques, devices and systems in publishing digital contents such as encyclopedia are provided. FIG. 1 is a flowchart illustrating a method for publishing encyclopedia according to an embodiment of the disclosed technology. The method includes the following steps.

Step S10 is to obtain entries of encyclopedic resource files.

Step S20 is to index attributes of each entry by using preset indexing rules.

Step S30 is to reorganize the entries based on the attributes.

Step S40 is to publish the reorganized entries by applying a preset template.

The method uses a data structure to deal with the encyclopedic content in order to achieve efficient publishing of the encyclopedic knowledge.

In implementations, the encyclopedic resource files are structured according to their text styles so as to obtain a plurality of entries.

For example, content files of the encyclopedic entries can be collected, so that the existing content resources can be split structurally based on the encyclopedic entries to obtain an entry database of encyclopedic entries.

Figure 2:
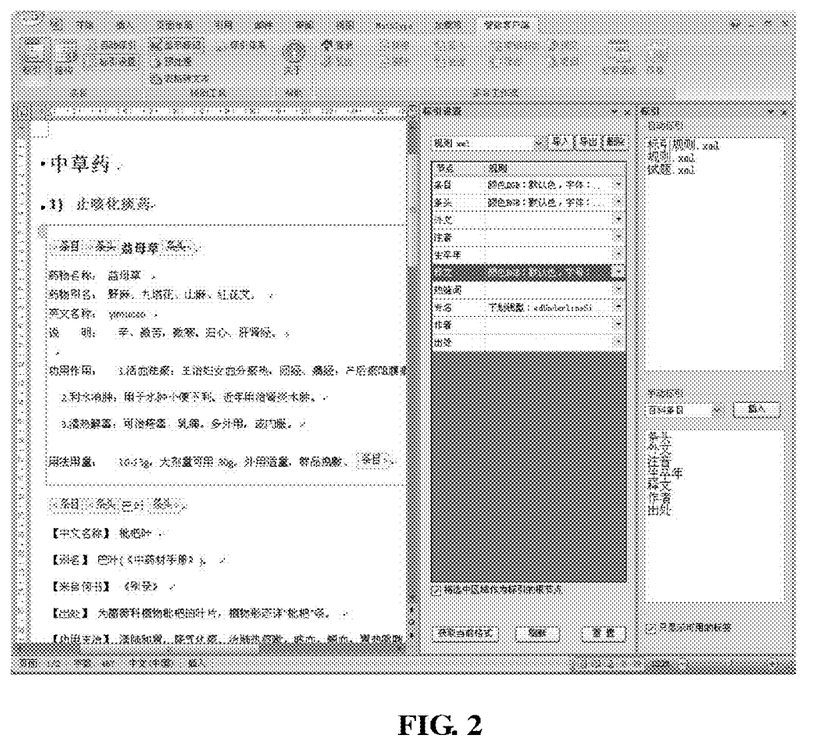
FIG. 2 is a view showing an effect diagram of entries according to an example of the disclosed technology.

FIG. 2 is a view showing an effect diagram of entries according to an example of the disclosed technology. As shown in FIG. 2, a user can open a encyclopedic document "encyclopedic knowledge of Chinese herbal medicines.doc (中草药百科知识.doc)". The rules in respect of the text styles are that "Color RGB: default color, font: (Chinese)+Chinese text, size: small four, bold" and the rules in respect of the explanation are that "Color RGB: default color, font: (Western language)+Chinese text, size: small five". Then, the encyclopedic entries in the document are automatically indexed, and the structures of the entries, such as topics and explanations or the like, are automatically extracted according to automatic extraction rules. The user can output an encyclopedic-entry-structured indexing system. Then, the user can input a structured indexing system.

The automatic extraction rules .xml preset for the document "encyclopedic knowledge of Chinese herbal medicines.doc" can be defined as follows:

```
<?xml version="1.0" encoding="utf-8"?>
<xmatch version="1.0">
<mapto element="ENTRY" />
    <expression>
        <and>
            <fontRule font="(Chinese) + Chinese Text"
            size="12" bold="true" color="default" />
        </and>
    </expression>
</st_match>
<st_match>
    <mapto element="TOPIC" />
    <expression>
        <and>
            <fontRule font="(Chinese) + Chinese Text"
            size="12" bold="true" color="default" />
        </and>
    </expression>
</st_match>
    <st_match>
```

-continued

```
        <mapto element="ENGLISH NAME" />
        <expression>
            <and>
                <regexRule text=" [ENGLISH NAME] " />
            </and>
        </expression>
    </st_match>
    <st_match>
    <st_match>
        <mapto element="EXPLANATION" />
        <expression>
            <and>
                <fontRule font="" size="9"
                color="default" />
            </and>
        </expression>
    </st_match>
    <st_match>
        <mapto element="SOURCE" />
        <expression>
            <and>
                <fontRule font="simsun" size="9"
                italic="true" color="default" />
            </and>
        </expression>
    </st_match>
    <st_match element="Char" bMatchAll="true">
        <mapto element="PROPER NOUN">
        </mapto>
        <expression name="underline">
            <and>
                <fontRule font="simsun" size="9"
                underline="wdUnderlineSingle"
color="default" />
            </and>
        </expression>
    </st_match>
</st_matches>
</xmatch>
```

The automatic extraction rules can be implemented in various ways. Two examples are a WORD text style rule and a regular expression rule.

The WORD text style rule provides provisions and protocols for automatically processing digital contents in Word file format and for extracting information from the WORD text styles. The detailed extracting rules include common style rules for WORD document editing. Some common style rules for WORD document editing are listed in the table below as examples.

| EXEMPLARY STYLE RULES FOR WORD DOCUMENT EDITING | | | |
|---|---|---|---|
| font | 字体 | underline | 下划线 |
| size | 字体大小 | | |
| color | 字体颜色 | | |
| italic | 斜体 | | |
| bold | 粗体 | | |

In processing and extracting encyclopedic entries which have more complicated formats than Word files, the extracting rules can be automatically matched via regular expressions. For example, if the prefix of the "【ENGLISH NAME】" is extracted as the English name of the entry, the rule of the regular expressions is that <regexRule text=" 【ENGLISH NAME】">.

In some implementations, the attributes include the source, applicable object, age, keyword and author.

As a specific example, the storage table structure of certain encyclopedic entries can be shown in the following table.

| EXEMPLARY STORAGE TABLE STRUCTURE OF ENCYCLOPEDIC ENTRIES | | | |
|---|---|---|---|
| SYS_DOCUMENTID | Document ID | INTEGER | 12 |
| SYS_CREATED | Creation Time | TIME-STAMP | 0 |
| SYS_LASTMODIFIED | Last Modified Time | TIME-STAMP | 0 |
| SYS_CURRENTNODE | Current Node | INTEGER | 4 |
| SYS_CURRENTSTATUS | Current Status | VARCHAR | 60 |
| SYS_AUTHORS | Authors | VARCHAR | 255 |
| SYS_TOPIC | Topic | VARCHAR | 255 |
| DOC_EXPLAIN | Explanation of Entry | CLOB | 0 |
| DOC_CATALOG | Catalog of Encyclopedia | VARCHAR | 255 |
| DOC_CATALOGID | Catalog Cascade ID of Encyclopedia | VARCHAR | 255 |
| DOC_CATALOGLEAFID | Catalog Leaf ID of Encyclopedia | INTEGER | 4 |
| DOC_KEYWORD | Keyword | VARCHAR | 255 |
| DOC_SOURCE | Source | VARCHAR | 255 |
| DOC_KNOWNTYPE | Type of Entry | INTEGER | 3 |
| DOC_ORICATALOGLEAFID | Catalog Leaf ID of Original File | INTEGER | 4 |
| DOC_ORICATALOGID | Catalog ID of Original File | VARCHAR | 255 |
| DOC_ORICATALOG | Catalog of Original File | VARCHAR | 255 |
| DOC_TYPE | Type of Entry | VARCHAR | 32 |
| DOC_XMLDATA | XML of Entry | CLOB | 0 |
| STATUS | Code of Status | INTEGER | 0 |
| LANUAGE | Language | VARCHAR | 255 |
| WORDNUM | Number of words | VARCHAR | 255 |
| TRANSLATOR | Translator | VARCHAR | 255 |
| SNOPSIS | Abstract | CLOB | 0 |
| DOC_TAGTEXT | Entry Content with Structure Label | CLOB | 0 |
| DOC_TEXT | Text of Entry | CLOB | 0 |
| DEPART | Depart | VARCHAR | 1024 |
| DEPARTID | Depart ID | INTEGER | 0 |
| DEPART_CASCADID | Cascade ID of Depart | VARCHAR | 255 |
| MARK_SYSTEM | Mark System | VARCHAR | 255 |
| DOC_VERSION | Version of Document | VARCHAR | 32 |

In the table above, the identification names (IDs) of the entries are stored in and uniquely identified by values in the "SYS_DOCUMENTID" field, the respective contents of the entries are stored in the "DOC_EXPLAIN" field and the topics of the entries are stored in the "SYS_TOPIC" field. The "DOC_EXPLAIN" field is a large text field and stores the content of the structured xml entries.

In some implementations, the entries are reorganized according to certain criteria, e.g., at least one of the applicable object, the age and the keyword.

Figure 3:
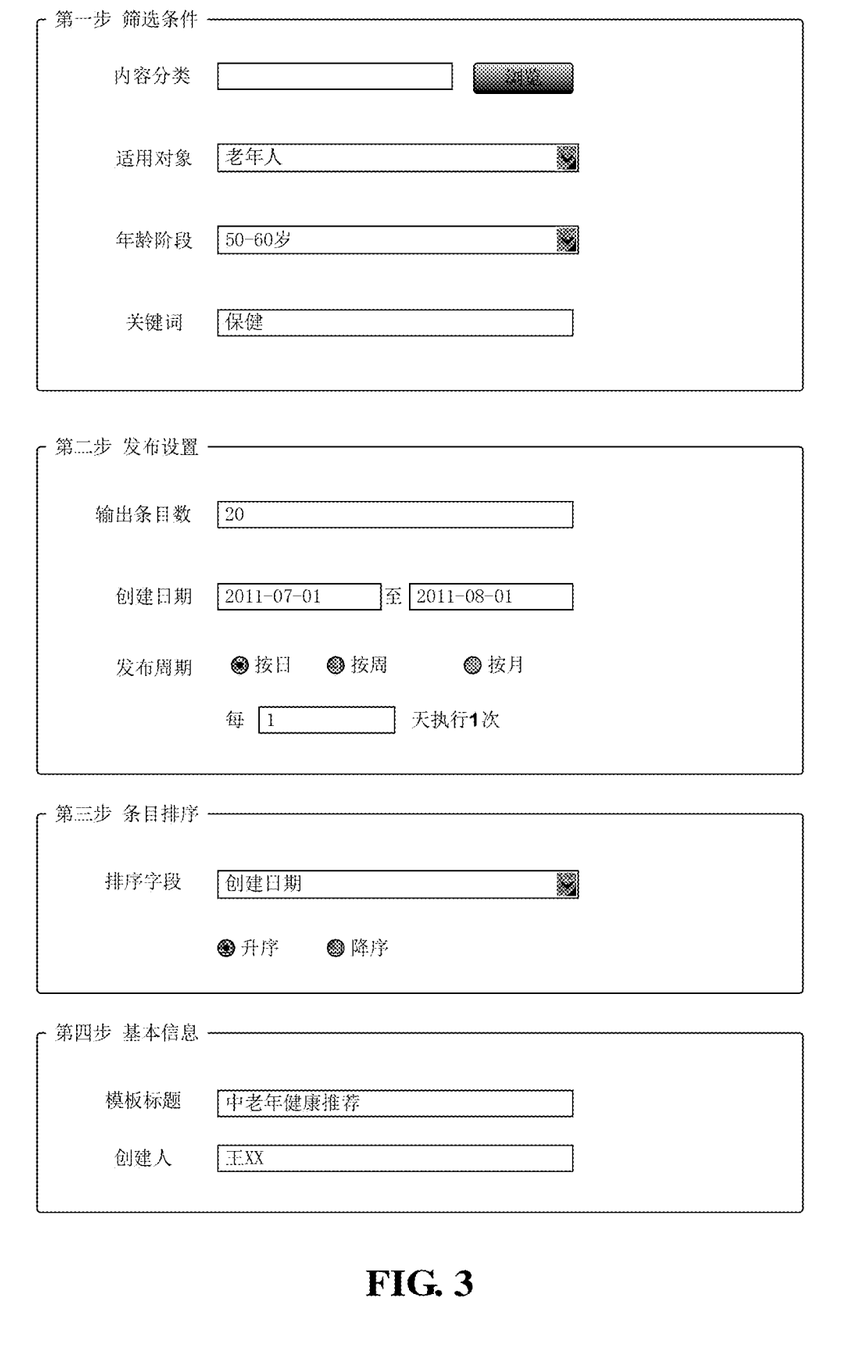
FIG. 3 is a view showing an effect diagram of the content reorganization according to an embodiment of the disclosed technology.

FIG. 3 is a view showing an effect diagram of the content reorganization according to an embodiment of the disclosed technology. The top drawing in FIG. 3 shows an example of a user interface for setting selection conditions where the entries are reorganized according to at least one of the applicable object, the age and the keyword. The second drawing from the top in FIG. 3 shows an example of a user interface for setting publishing settings such as the number of the entries of the available content, the date or time period of the content creation, the frequency of the publication based on making a publication per day, per week or per month. The third drawing from the top in FIG. 3 shows an example of a sorting user interface to provide a sorting feature based on the attribute fields of the entries. The bottom drawing in FIG. 3 shows an example of a content template.

As shown in FIG. 3, screening conditions, publishing settings and sorting conditions of the entries are set. It can be specified that only a classification of the encyclopedic entries are published by selecting the classification of content. The source entries of the server are screened based on the attribute fields such as the applicable object, the age, the keyword and the like, so that only the entries which meet the conditions can be published. The number of the entries of content to be published can be set. The entries can be published timely according to the creation dates of the entries, and the definite period for publishing can also be set. The sorting rules of the final entry content can be set, and the entries can be sorted at will based on the attribute fields of the entries, such as sorted in an ascending order based on the creation date. The content template is stored according to the name of the template and information of the creator. The content of the entries which output based on the content template is an xml common format, as shown in FIG. 4.

Examples of some major nodes of the entry structures are provided in the table below.

| EXAMPLES OF SOME MAJOR NODES OF THE ENTRY STRUCTURES | |
|---|---|
| <ENTRY> | Root node of encyclopedic entry |
| <dp:innerAttrs> | System attribute node of encyclopedic entry |
| <dp:attrs> | Attribute node of encyclopedic entry |
| <TOPIC> | Topic of encyclopedic entry |
| <EXPLAIN> | Text of encyclopedic entry |

In some implementations, publishing the reorganized entries by applying a preset template includes: pre-creating an Html template, an Epub template and an MMS template; applying the Html template to the reorganized entry to obtain the content of Html and publishing the content of Html via a website; applying the Epub template to the reorganized entry to obtain the content of Epub and publishing the content of Epub via a mobile terminal; and applying the MMS template to the reorganized entry to obtain the content of MMS and publishing the content of MMS via a mobile terminal.

In digital publishing, the way for a person to read is no longer confined to reading contents printed on paper or other fixed media. Instead, various manners of reading are available such as reading via a phone, a network, an e-reader, a tablet computer and other electronic or communication devices. Such reading of digital contents has significantly changed people's traditional paper reading habit and may require diverse publishing for the content publishing.

In implementations, different kinds of entry publishing can be used. Three entry publishing examples are Html template for website publishing; Epub template for mobile publishing; and MMS template for multimedia messaging service publishing. The form of an output file can be selected as a shared directory or an ftp.

Figure 5:
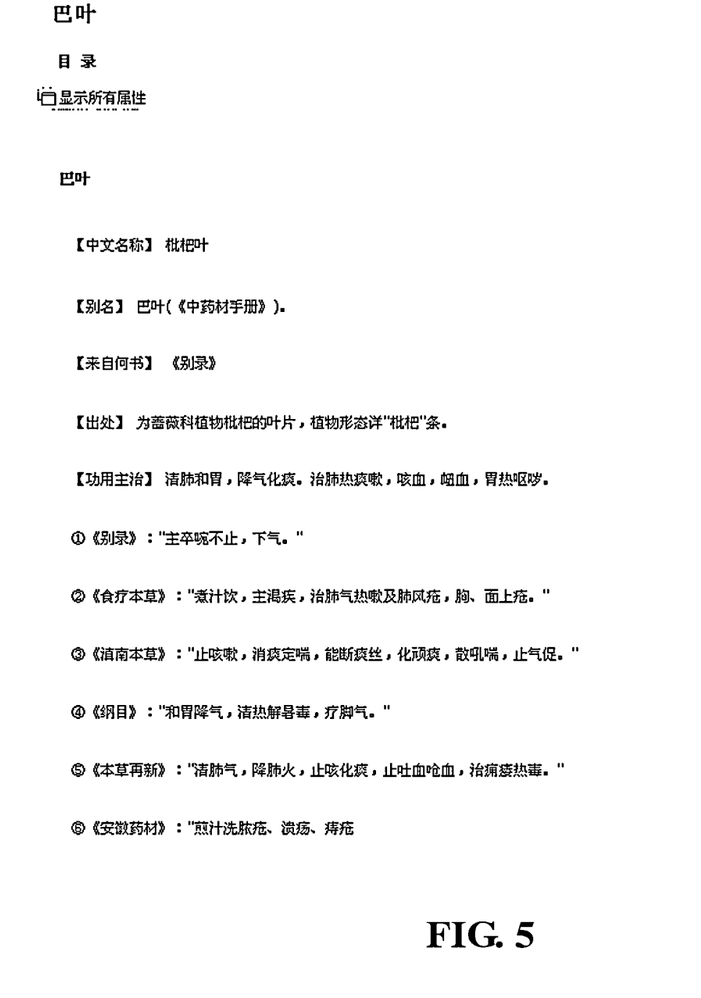
FIG. 5 is a view showing an effect diagram which illustrates selecting the built-in markup language publishing template for the user to publish the content template via a web, e.g., the widely used HyperText Markup Language (html).

FIG. 5 is a view showing an effect diagram which illustrates selecting the built-in html publishing template for the user to publish the content template via a web.

Figure 6:
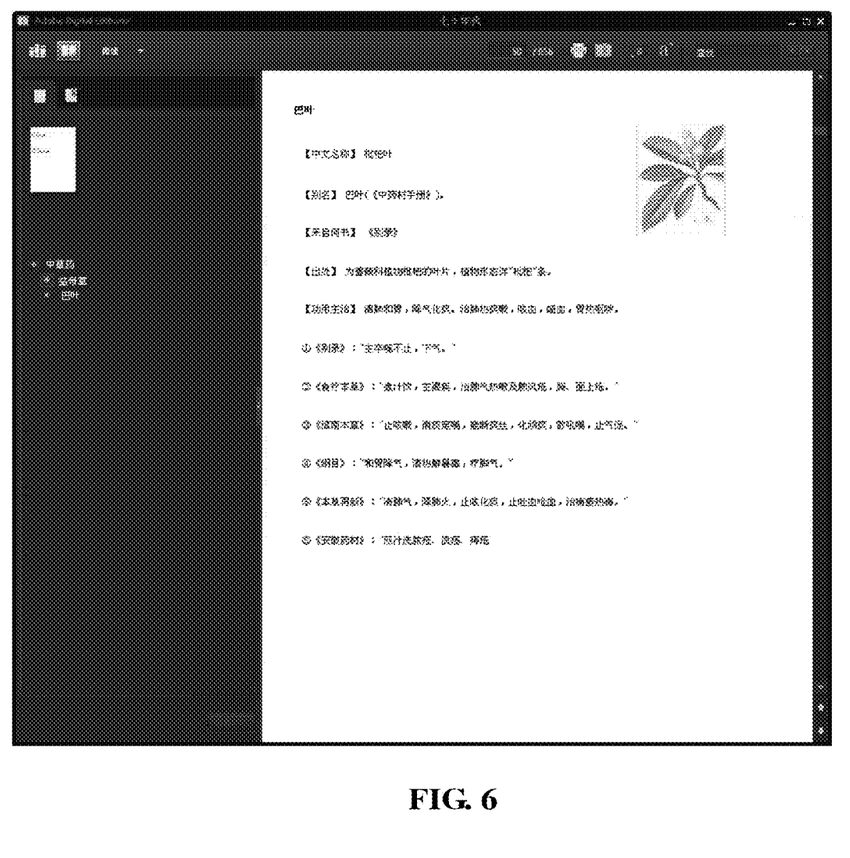

FIG. 6 is a view showing an effect diagram which illustrates selecting the built-in Epub template for the user to publish the entry content via a mobile device.

Figure 7:
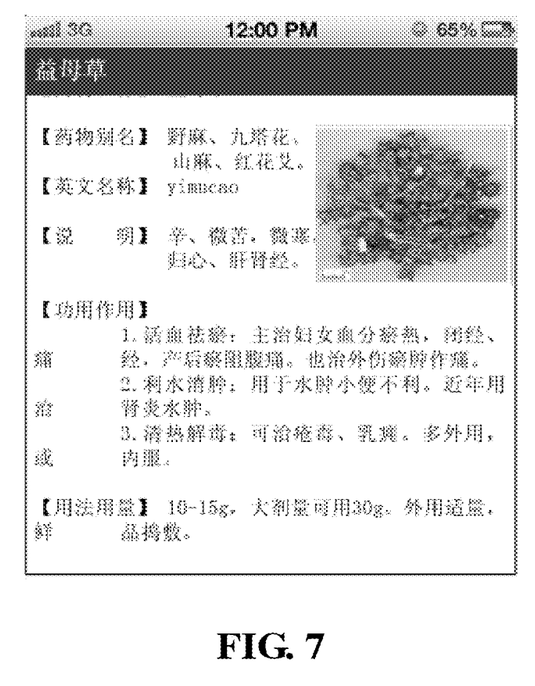
FIG. 7 is a view showing an effect diagram which illustrates selecting the built-in MMS template for the user to publish the mobile phone entry content. MMS is the Multimedia Messaging Service standard for messages with multimedia content to and from mobile phones or devices and extends the SMS (Short Message Service) capability.

FIG. 7 is a view showing an effect diagram which illustrates selecting the built-in MMS template for the user to publish the mobile phone entry content.

The publishing template can be an xslt format. The xml content file output by the content template can be matched with the xslt publishing template selected by the user, to organize the content and then to convert to a content resource package in a different publishing form. The xslt publishing template is given as follows:

```
<?xml version="1.0"?>
<xsl:stylesheet version="1.0"
xmlns:xsl="http://www.w3.org/1999/XSL/Transform">
    <xsl:output method="html" version="1.0" encoding="UTF-8"
    indent="yes"/>
    <xsl:template match="/">
        <body>
            <xsl:apply-templates select="/body"/>
        </body>
    </xsl:template>
    <xsl:template match="body">
        <xsl:apply-templates/>
    </xsl:template>
    <xsl:template match="ENTRY">
        <xsl:apply-templates/>
    </xsl:template>
    <xsi:template match="xhtml">
        <xsl:for-each select="child::node( )">
            <xsl:choose>
                <xsl:when test="local-name( )='sup'">
                    <font size="1">
                        <xsl:copy-of select="self::node( )"/>
                    </font>
                </xsl:when>
                <xsl:when test="local-name( )='sub'">
                    <font size="1">
                        <xsl:copy-of select="self::node( )"/>
                    </font>
                </xsl:when>
                <xsl:otherwise>
                    <xsl:copy-of select="self::node( )"/>
                </xsl:otherwise>
            </xsl:choose>
        </xsl:for-each>
    </xsl:template>
    <xsl:template match="TOPIC">
        <br>
            <xsl:apply-templates select="xhtml"/>
        </br>
    </xsl:template>
    <xsl:template match="FOREIGN LANGUAGE">
        <xsl:text> </xsl:text>
            <xsl:apply-templates select="xhtml"/>
        <xsl:text> </xsl:text>
    </xsl:template>
    <xsl:template match="PHONETIC NATATION">
        <xsl:text> </xsl:text>
            <xsl:apply-templates select="xhtml"/>
        <xsl:text> </xsl:text>
    </xsl:template>
    <xsl:template match="BIRTH AND DEATH">
        <xsl:text> </xsl:text>
            <xsl:apply-templates select="xhtml"/>
        <xsl:text> </xsl:text>
    </xsl:template>
    <xsl:template match="EXPLAIN">
        <p>
            <xsl:apply-templates/>
        </p>
    </xsl:template>
    <xsl:template match="AURHER">
        <br>
            <xsl:apply-templates select="xhtml"/>
        </br>
    </xsl:template>
    <xsl:template match="RESOURCE">
        <br>
            <xsl:apply-templates select="xhtml"/>
        </br>
    </xsl:template>
    <xsl:template match="PROPER NOUN">
        <xsl:apply-templates select="xhtml"/>
    </xsl:template>
```

-continued

```
    </xsl:template>
    <xsl:template match="HOTLINK WORD">
        <xsl:apply-templates select="xhtml"/>
    </xsl:template>
</xsl:stylesheet>
```

The disclosed embodiments can improve the reuse of the entry to eliminate the drawbacks that the various forms of publishing require to repeat the content production for many times in the traditional publishing field.

Figure 8:
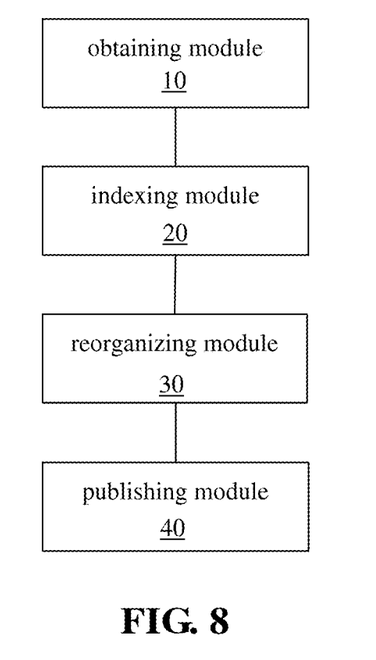
FIG. 8 is a schematic diagram illustrating a device for publishing encyclopedia according to an embodiment of the disclosed technology.

FIG. 8 is a schematic diagram illustrating a device or system for publishing encyclopedia according to an embodiment of the disclosed technology. The device as shown includes: an obtaining module 10 configured to obtain entries of encyclopedic resource files; an indexing module 20 configured to index attributes of each entry by using preset indexing rules; a reorganizing module 30 configured to reorganize the entries based on the attributes; and a publishing module 40, configured to publish the reorganized entries by applying a preset template. In implementations, the modules 10, 20, 30 and 40 may be implemented in one computer for some applications and may be implemented in two or more computers in other applications. Hence, the device here is generally used to indicated the collective device or system having the modules 10, 20, 30 and 40.

The device uses a data structure to deal with encyclopedic content in order to achieve efficient publishing of the encyclopedic knowledge.

In some implementations, the obtaining module 10 structures the encyclopedic resource files based on text styles of the encyclopedic resource files to obtain a plurality of entries.

In some implementations, the attributes include source, applicable object, age, keyword and author.

In some implementations, the reorganizing module 30 reorganizes the entries based on at least one of the applicable object, the age and the keyword.

Also in some implementations, the publishing module 40 pre-creates an Html template, an Epub template and an MMS template; applies the Html template to the reorganized entry to obtain the content of Html and publishing the content of Html via a website; applies the Epub template to the reorganized entry to obtain the content of Epub; publishes the content of Epub via a mobile terminal; applies the MMS template to the reorganized entry to obtain the content of MMS; and publishes the content of MMS via a mobile terminal.

In view of the above, implementations of the disclosed technology can be used to realize multiple publishing of an encyclopedia or broadcasting-style publishing of a the encyclopedia, provide new reading ways in the new era of digital publishing, and have at least one of the effects of realizing a structured management of the encyclopedia, improving the reuse of the encyclopedic entry resources, improving the operating efficiency of the reorganization of encyclopedic entries; or providing multiple content publishing.

One or more device modules in FIG. 8 or one or more software modules that provide the processing and publishing in FIG. 1 can be implemented in a computer-based digital publishing system or network to interface between users and the back-end digital libraries or resources that store certain digital contents or have access to certain digital contents. A user can use a user mobile device or computer device to interact with the device modules in FIG. 8 or a software module providing the process in FIG. 1 to receive the published digital content. For example, a user can user the options in FIG. 3 to select how the contents to be viewed or used. In some applications of the disclosed technology, a publisher or a content provider can incorporate the process in FIG. 1 or the modules in FIG. 8 in a digital content system or a digital content software package to make various digital contents that are owned by or accessible by the publisher or a content provider available to users.

A person having ordinary skill in the relevant art will understand that each module or each step in various implementations of the disclosed technology can be realized with a computing device. The modules or steps can be integrated in a single computing device or distributed in a network composed of a plurality of computing devices. Optionally, the modules or steps can be realized by computing device executable program code such that they can be stored in a storage device to be executed by the computing device. Or, the modules or steps can be realized by making each of them to be produced to an integrated circuit module respectively or making some of the modules or steps to be produced to a single integrated circuit module. Thus, implementations of the disclosed technology are not limited to any particular hardware, software and the combination thereof.

The disclosed and other embodiments and the functional operations described in this specification can be implemented in digital electronic circuitry, or in computer software, firmware, or hardware, including the structures disclosed in this specification and their structural equivalents, or in combinations of one or more of them.

For example, the disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus. As a specific example, a computer program product can be encoded on a computer-readable medium and is operable to cause data processing apparatus to obtain entries of the encyclopedic resource files; index attributes of each of the entries by using preset indexing rules; reorganize the entries based on the attributes; and publish the reorganized entries by applying a preset template.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device or screen, e.g., LCD (liquid crystal display) screen or other types of flat panel screens or a touch screen, for displaying information to the user and a user input interface device such as a touch screen, a keyboard or a pointing device (e.g., a mouse or a trackball), by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes one or more back-end components, e.g., as one or more data servers, or that includes a middleware component, e.g., an application server, or that includes one or more front-end components, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

As a specific example, a computer system for implementing the disclosed embodiments can include client computers (clients) and server computers (servers). A client and a server are generally remote from each other and typically interact through a communication network. The relationship of client and server can arise by virtue of computer programs running on the respective computers and having a client-server relationship to each other. In implementations, a communication network is provided to enable communications for communication devices with the network, such as computers or mobile devices. In some implementations, the communication network can be a single computer network such as a computer network within an enterprise or a network of interconnected computer networks such as the Internet. One or more computer servers are connected to the communication network and are to provide various functions or mechanisms described in this specification. In operation, one or more client computers (e.g., a user computer or mobile phone or an e-reader) can use the communication network to remotely access the one or more servers.

Therefore, in one implementation, a network system for digital publishing can be provided based on the above teaching to include one or more computer storage devices in the network that store digital documents including encyclopedic resource files, and one or more computer servers in communication with the one or more computer storage devices to have access to the digital documents including encyclopedic resource files. In this network system, the one or more computer servers are configured to obtain entries of the encyclopedic resource files; index attributes of each of the entries by using preset indexing rules; reorganize the entries based on the attributes; and publish the reorganized entries by applying a preset template. In implementations, the one or more computer servers can be configured to allow a user to provide input to the one or more computer servers to initiate a search in the one or more computer storage devices to search and obtain the encyclopedic resource files based on the user input; the one or more computer servers are configured to allow a user to reorganize the entries based on the attributes.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for publishing encyclopedia, comprising:
    obtaining entries of encyclopedic resource files;
    indexing attributes of each of the entries by using preset indexing rules;
    reorganizing the entries based on the attributes, wherein said reorganizing comprises setting screening conditions, publishing settings and sorting conditions of the entries so that only entries which meet the screening conditions are to be published in accordance with the published settings and the sorting conditions; and
    publishing the reorganized entries by applying a preset template.

2. The method according to claim 1, wherein the encyclopedic resource files are structured according to text styles of the encyclopedic resource files so as to obtain the entries.

3. The method according to claim 1, wherein the attributes comprise a source, applicable object, age, keyword and author.

4. The method according to claim 3, wherein the entries are reorganized based on at least one of the applicable object, the age and the keyword.

5. The method according to claim 1, wherein the step of publishing the reorganized entries by applying a preset template comprises:
    pre-creating an Html template, an Epub template and an MMS template;
    applying the Html template to the reorganized entry to obtain content of Html and publishing the content of Html via a website;
    applying the Epub template to the reorganized entry to obtain content of Epub and publishing the content of Epub via a mobile terminal; and
    applying the MMS template to the reorganized entry to obtain content of MMS and publishing the content of MMS via a mobile terminal.

6. A device for publishing encyclopedia, comprising:
    an obtaining module configured to obtain entries of encyclopedic resource files;
    an indexing module configured to index attributes of each of the entries by using preset indexing rules;
    a reorganizing module configured to reorganize the entries based on the attributes, wherein the reorganizing comprises setting screening conditions, publishing settings and sorting conditions of the entries so that only entries which meet the screening conditions are to be published in accordance with the published settings and the sorting conditions; and
    a publishing module configured to publish the reorganized entries by applying a preset template.

7. The device according to claim 6, wherein the obtaining module structures the encyclopedic resource files according to text styles of the encyclopedic resource files so as to obtain the entries.

8. The device according to claim 6, wherein the attributes comprise a source, applicable object, age, keyword and author.

9. The device according to claim 8, wherein the reorganizing module reorganizes the entries based on at least one of the applicable object, the age and the keyword.

10. The device according to claim 6, wherein the publishing module
    pre-creates an Html template, an Epub template and an MMS template;
    applies the Html template to the reorganized entry to obtain content of Html and publishes the content of Html via a website;
    applies the Epub template to the reorganized entry to obtain content of Epub and publishes the content of Epub via a mobile terminal; and applies the MMS template to the reorganized entry to obtain content of MMS and publishes the content of MMS via a mobile terminal.

11. A network system for digital publishing, comprising:
one or more computer storage devices that store digital documents including encyclopedic resource files; and
one or more computer servers in communication with the one or more computer storage devices to have access to the digital documents including encyclopedic resource files, wherein the one or more computer servers are configured to obtain entries of the encyclopedic resource files;
index attributes of each of the entries by using preset indexing rules;
reorganize the entries based on the attributes, wherein the reorganizing comprises setting screening conditions, publishing settings and sorting conditions of the entries so that only entries which meet the screening conditions are to be published in accordance with the published settings and the sorting conditions; and
publish the reorganized entries by applying a preset template.

12. The network system as in claim 11, wherein the one or more computer servers are configured to allow a user to provide input to the one or more computer servers to initiate a search in the one or more computer storage devices to search and obtain the encyclopedic resource files based on the user input;
wherein the one or more computer servers are configured to allow a user to reorganize the entries based on the attributes.

* * * * *